United States Patent [19]

Tucker et al.

[11] Patent Number: 4,762,331
[45] Date of Patent: Aug. 9, 1988

[54] COMBINATION AUTOMOBILE SEAT AND STROLLER

[75] Inventors: J. Camille Tucker; Klaus D. Weiswurm, both of San Antonio, Tex.

[73] Assignee: Gee-I-Go, Inc., San Antonio, Tex.

[21] Appl. No.: 925,302

[22] Filed: Oct. 31, 1986

[51] Int. Cl.[4] .............................................. B62B 7/12
[52] U.S. Cl. .................................... 280/30; 280/643; 280/47.4
[58] Field of Search ................... 280/30, 638, 38, 641, 280/642, 643, 47.37 R, 47.4

[56] References Cited

U.S. PATENT DOCUMENTS

| | | | |
|---|---|---|---|
| 2,720,911 | 10/1955 | Lantz | 280/30 |
| 3,290,050 | 12/1966 | Ezquerra | 280/30 |
| 3,679,223 | 7/1972 | Sakal | 280/642 X |
| 3,829,113 | 8/1974 | Epelbaum | 280/30 |
| 4,537,414 | 8/1985 | Nusbaum | 280/47.37 R X |
| 4,632,409 | 12/1986 | Hall et al. | 280/30 |
| 4,641,844 | 2/1987 | Mar et al. | 280/30 |
| 4,647,054 | 3/1987 | Chong | 280/30 |

Primary Examiner—John J. Love
Assistant Examiner—Michael Mar
Attorney, Agent, or Firm—Cox & Smith Incorporated

[57] ABSTRACT

A combination car seat and stroller having a plurality of wheels which are pivotable between a first, lowered position for use as a stroller and a second, raised position for use as a car seat. An extendable handle is provided for pushing the apparatus when the wheels are in the first, lowered position. A spring or clip is provided for locking the wheels in the first, lowered position for use as a stroller. The wheels are pivoted to a second, raised position to allow the apparatus to be placed on the seat of an automobile, an airplane seat, or other surface. Slots in the arms of the chair are provided for releasably engaging the apparatus with the seatbelt of the automobile or airplane seat. The apparatus is provided with a selectably extendable footrest whch can be retracted when the wheels are pivoted to the second, raised position.

3 Claims, 6 Drawing Sheets

COMBINATION AUTOMOBILE SEAT AND STROLLER

BACKGROUND OF THE INVENTION

The present invention relates to a combination automobile seat and stroller for infants and small children. More particularly, the present invention relates to a combination car seat and stroller comprising a substantially rigid chair having a plurality of wheels pivotally mounted thereto, the wheels being selectively pivotable from a first, lowered position for use as a baby stroller, to a second, raised position for use of the chair as an automobile safety seat.

The present invention solves a number of problems associated with the transportation of infants and small children. For instance, the apparatus of the present invention is adapted to fit in automobiles when used as a car seat yet, at the same time, is durable enough to be pushed over bumps and other obstacles and withstand the wear and tear of being used as a stroller. Further, the apparatus of the present invention is proportioned to permit the seat to be positioned on the seat of a commercial airplane.

A stroller is often rolled through mud, ice or snow such that if placed upon the seat of automobile or airliner, the seat on which the apparatus is placed would be soiled by the mud, ice or snow. The present invention overcomes that problem by providing a means for covering the wheels when pivoted to the second, raised position to prevent soiling of the surface on which the apparatus rests.

Another problem is that the legs of the child in the seat can project from the front of a stroller such that the child's legs can be caught in the wheels or steering mechanism or can double under the front edge of the seat when the stroller is pushed or turned. Most strollers solve that problem by affixing a foot rest to the front of the seat of the stroller. However, if a stroller having a foot rest thereon is then folded for use as an automobile safety seat, the footrest projects from the front of the chair, making it difficult to move the chair in and out of car doors. The apparatus of the present invention provides a retractable footrest to solve that problem. Likewise, the apparatus provides an extendable handle for pushing the apparatus when used as a stroller which is retracted for use as an automobile safety seat.

The prior art includes a number of patents describing devices intended to solve these problems. For instance, U.S. Pat. No. 2,720,911 is directed to a convertable baby stroller and child's seat for automobiles which, as best as can be determined, could not pass the various federal regulatory requirements for an automobile safety seat. U.S. Pat. No. 3,290,050 discloses a vehicle for transporting a baby which includes a base which is configured to receive a seat having holes therein for engaging a series of spindles for releasably locking the seat to the base. However, the base cannot be folded up and conveniently transported with the seat portion of that device. U.S. Pat. No. 3,549,164 discloses a combination baby stroller and car seat having a rigid one-piece body which is contoured to fit the car seat and an inset wheel which allows the car seat to be wheeled in a manner similar to a wheel barrow. Because the wheel is mounted on a single axle, that device does not have the necessary stability for use as a baby stroller. U.S. Pat. No. 3,829,113 is directed to an adapter for a child car seat which allows the car seat to be used as a stroller. However, the adapter cannot be folded so that it can be transported along with the car seat. Consequently, none of the prior art solves all of the problems associated with the transportation of infants and small children. Specifically, there is no disclosure of a combination car seat and baby stroller which can be conveniently folded for use as a car seat which is light in weight yet durable, which meets all government regulatory requirements, which fits into automobiles of all sizes, which is durable, and which is inexpensive to manufacture.

An object of the present invention is, therefore, to provide a combination car seat and stroller apparatus for infants and small children comprising a substantially rigid chair, a plurality of wheels mounted to the chair, means for pivoting the wheels from a first, lowered position in which the chair can be rolled for use as a stroller to a second, raised position for use as a automobile safety seat, and a handle for pushing the seat when said wheels are in the first, lowered position.

Another object of the present invention is to provide a method of transporting an infant or small child comprising placing an infant or small child in a substantially rigid chair having a plurality of wheels pivotally mounted thereto in a first, lowered position, extending a handle and pushing the chair on the wheels, then pivoting the wheels to a second, raised position and retracting the handle when the chair is to be used as an automobile safety seat, resting the chair on the legs thereof on a surface such as the seat of an automobile, and releasably engaging the chair with the seatbelt of the seat of the automobile.

Another object of the present invention is to provide a combination car seat and stroller apparatus having a footrest to prevent the child's legs from interfering with the steering or being doubled under the chair when the chair is used as a stroller which can be retracted when the apparatus is used as an automobile safety seat.

Another object of the present invention is to provide a combination car seat and stroller apparatus having integral legs on which the chair of the seat rests when the wheels are pivoted to a second, raised position.

Another object of the present invention is to provide a combination car seat and stroller apparatus having means for biasing the wheels thereof towards a first, lowered position for use of the apparatus as a stroller.

Another object of the present invention is to provide a combination car seat and stroller apparatus having means positionable under the wheels thereof when the wheels are in the raised position for use as an automobile safety seat to prevent soiling of the seat of the automobile on which the seat is positioned.

SUMMARY OF THE INVENTION

These objects are accomplished in the present invention by providing a combination car seat and stroller apparatus for infants comprising a substantially rigid chair, a plurality of wheels mounted to the chair, means mounted to the chair for pivoting the wheels from a first, lowered position in which the chair can be rolled on the wheels for use as a stroller, to a second, raised position for use as a car seat, and a handle for pushing the chair when the wheels are in the first, lowered position.

Also provided is a method of transporting an infant or small child comprising placing an infant in a substantially rigid chair having a plurality of wheels pivotally mounted thereto, pivoting the wheels of the seat to a first, lowered position, extending a handle to facilitate pushing the chair on the wheels in the first, lowered position, pivoting the wheels to a second, raised position and collapsing the handle when the seat is to be used as an automobile safety seat, positioning the chair on the integral legs thereof on the seat of the automobile, and releasably engaging the chair with the seatbelt of the seat of the automobile.

DETAILED DESCRIPTION OF THE PREFERRED EMBODIMENT

Figures 1, 2:
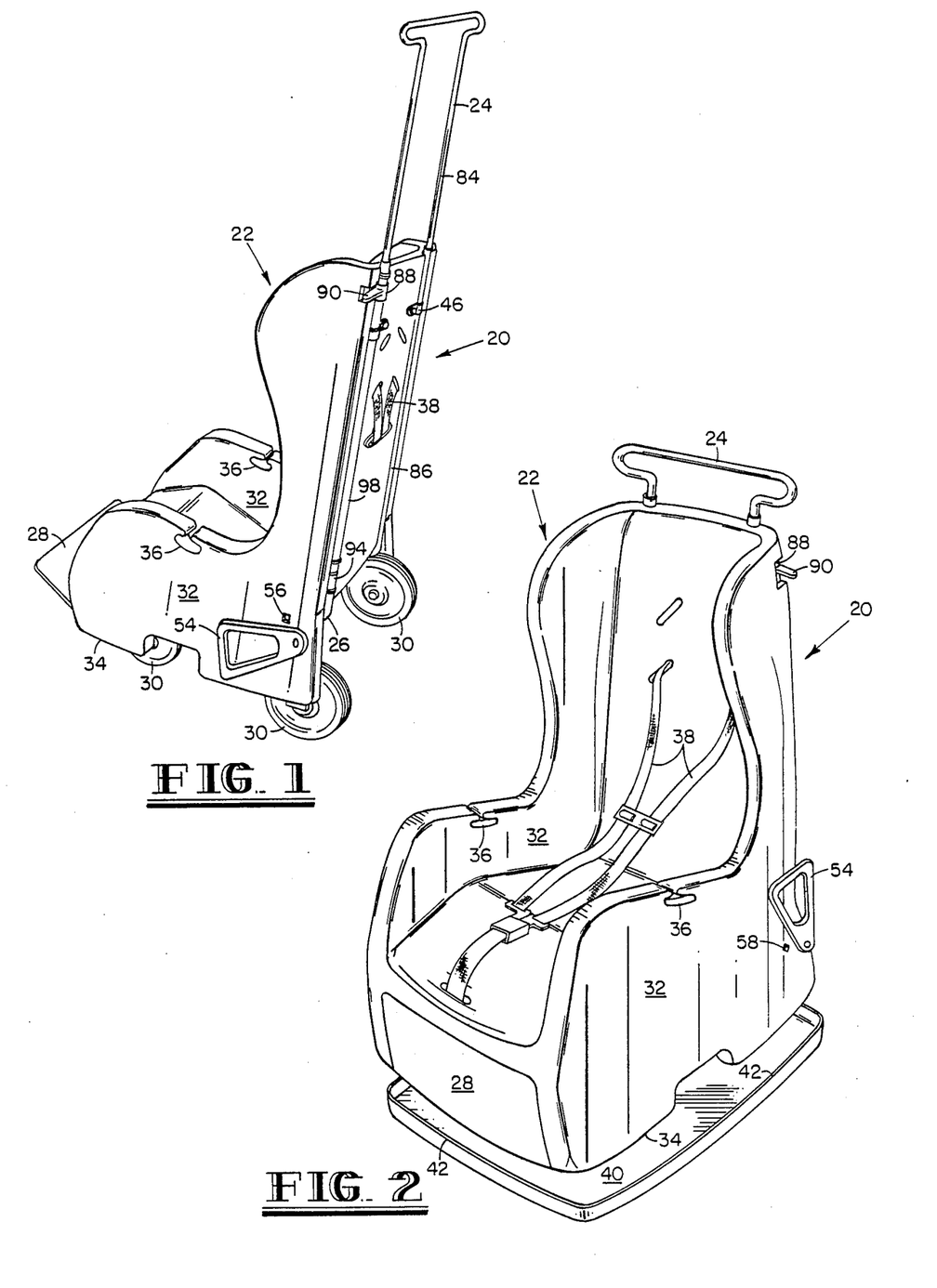
FIG. 1 is a perspective view of a presently preferred embodiment of the combination car seat and stroller apparatus of the present invention with the wheels in the first, lowered position for use of the apparatus as a stroller.
FIG. 2 is a perspective view of the apparatus of FIG. 1 having the handle and footrest retracted and the wheels raised for use of the apparatus as an automobile safety seat.

Referring to FIG. 1, there is shown a presently preferred embodiment of the present invention at reference numeral 20. Seat 20 is comprised of a chair 22 having a handle 24 integral with frame 26. Chair 22 is of substantially rigid construction, being formed from molded plastic or a similar material, and can be provided with cushions or molded with contours to receive an infant or small child comfortable therein. Chair 22 is of one piece construction having a substantially rigid back 23 and arm rests or sides 32, the sides 32 being provided with integral legs 34 and means in the form of a slot 36 to receive the seatbelt of an automobile seat. Chair 22 is provided with a footrest 28 and wheels 30 are mounted to frame 26. Chair 22 is provided with a shoulder harness 38 for retention of a small child or infant therein.

Means for selectively extending the footrest 28 is provided in the form of pivot pin 29 (see FIG. 7), and footrest 28 fits into the recess 31 in the front of chair 22 so that, when retracted, the exterior surface of footrest 28 is substantially flush with the surface of chair 22. A detent (not shown) can be provided in the wall of recess 31 to help retain footrest 28 therein.

Referring to FIG. 2, wheels 30 do not appear in that figure because the wheels 30 are in the first, lowered position as will be explained. When wheels 30 are in the position shown in FIG. 2, chair 22 is positioned on a means positionable under wheels 30 for covering the wheels 30. In the apparatus shown in FIGS. 1-7 and 13, the wheel covering means takes the form of a mat 40 having side walls 42 integral therewith which is placed upon an automobile seat or other surface (not shown) to receive chair 22 therein so that when the apparatus 20 is used as a stroller and ice, mud or snow collects on wheels 30, the wheels 30 will not soil the automobile seat.

Figure 3:
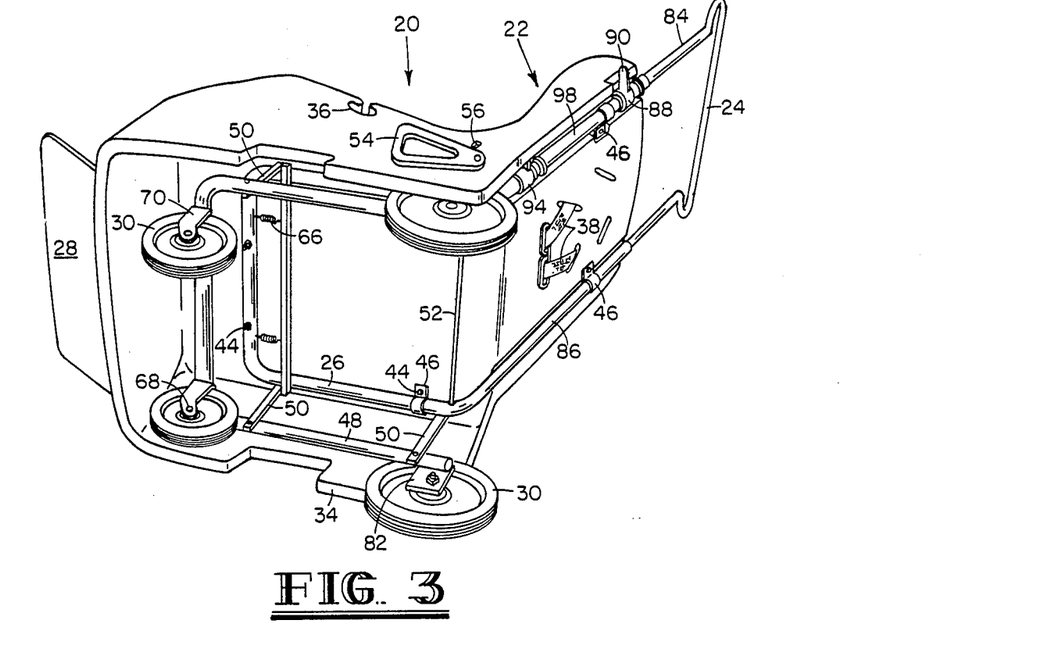
FIG. 3 is a perspective view of the bottom of the apparatus of FIG. 1 having the wheels in the first, lowered position for use of the apparatus as a stroller.
Figure 4:
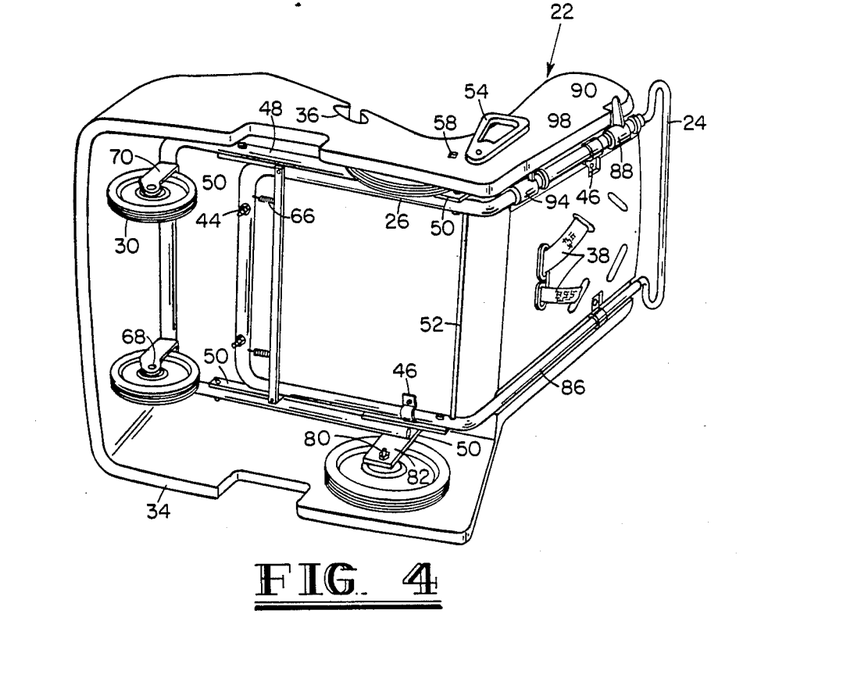
FIG. 4 is a perspective view of the bottom of the apparatus of FIG. 1 having the wheels in the second, raised position for use as an automobile safety seat.
Figure 6:
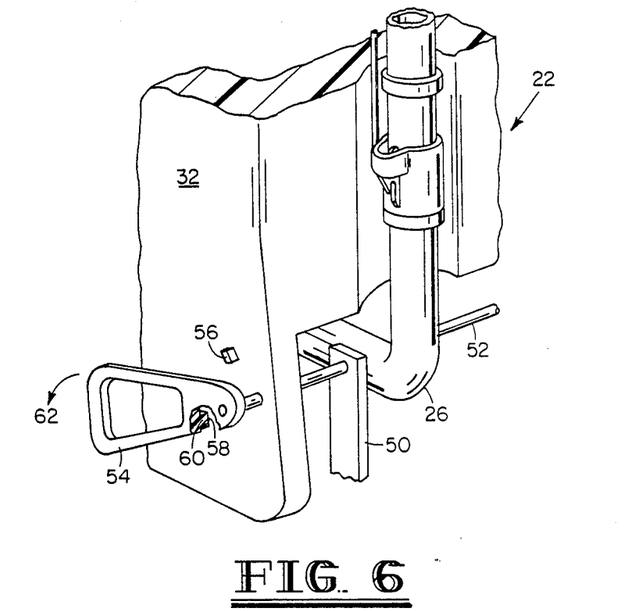
FIG. 6 is a partially cut-away, perspective view of the apparatus of FIG. 1 showing the handle and a portion of the mechanism for pivoting the wheels to the first, lowered position.
Figure 13:
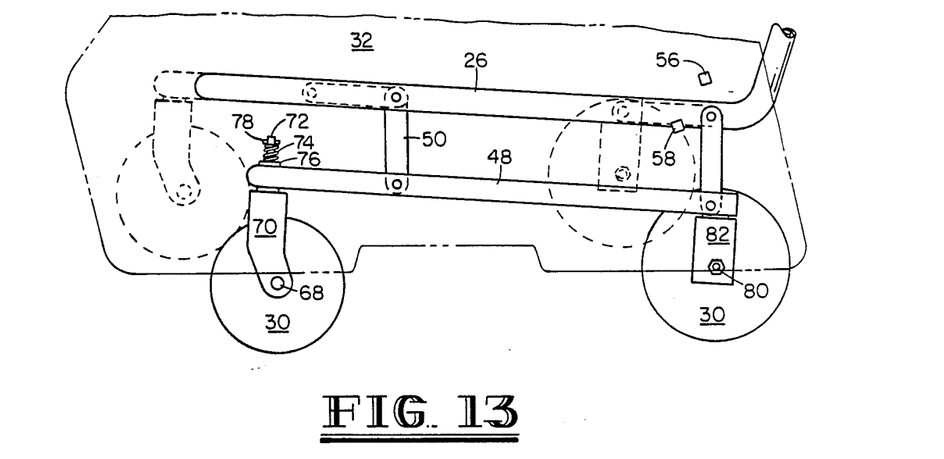
FIG. 13 is a side view of the mechanism for raising and lowering the wheels of the apparatus of FIG. 1.

Referring to FIGS. 3 and 4, frame 26 is held to chair 22 by bolts 44 and strap 46. As best shown in FIGS. 6 and 13, apparatus 20 is provided with means mounted to chair 22 for pivoting wheels 30 from a first, lowered position to a second, raised position in the form of the pivotal mounting of frame 26 to chassis 48 by four pivot members 50. Two of the pivot members 50 are welded to axle 52, and axle 52 is journaled within frame 26 to allow pivotal downward movement of frame 26 with respect to chassis 48 when handle 54, which is integral with axle 52, is moved from the lowered position shown in FIGS. 1, 3 and 6 to the upward position shown in FIGS. 2 and 4. The sidewall 32 of chair 22 is provided with an upper 56 and lower detent 58 to receive the extension tab 60 of handle 54 therein (see FIG. 13), thereby releasably locking the wheels 30 mounted to chassis 48 in either the raised position or the lowered position, respectively. Handle 54 is constructed of flexible, resilient plastic or similar material to allow the handle 54 to be pulled in the direction of arrow 62 (see FIG. 6) so that the extension tab 60 will be disengaged from either upper 56 or lower detent 58 so that the wheels 30 and chassis 48 can be either raised or lowered as desired.

Frame 26 is also provided with brace 64 and means for biasing the wheels 30 and chassis 48 towards a first, lowered position for use of the apparatus 20 as a stroller in the form of springs 66. In addition to lower detent 58, means for releasably locking the wheels 30 and chassis 48 in the first, lowered position is also provided in the form of the angular relationship of pivot members 50 to chassis 48. As shown in FIG. 13, when the extension tab 60 is releasably locked in lower detent 58, the pivot members 50, bearing frame 26 thereon, are positioned up over center with relation to chassis 48, further locking wheels 30 in the first, lowered position.

Figure 7:
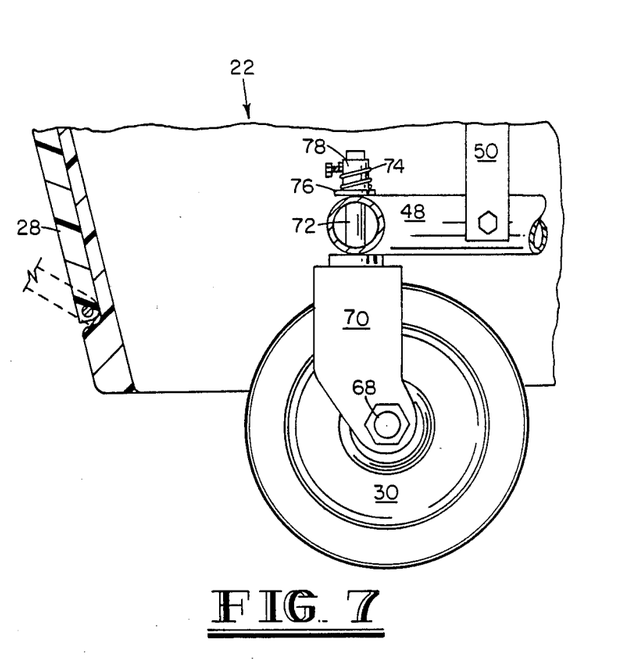
FIG. 7 is a partial sectional view taken along the lines 7—7 in FIG. 3 showing a portion of the chassis and retractable footrest of the apparatus.
Figure 8:
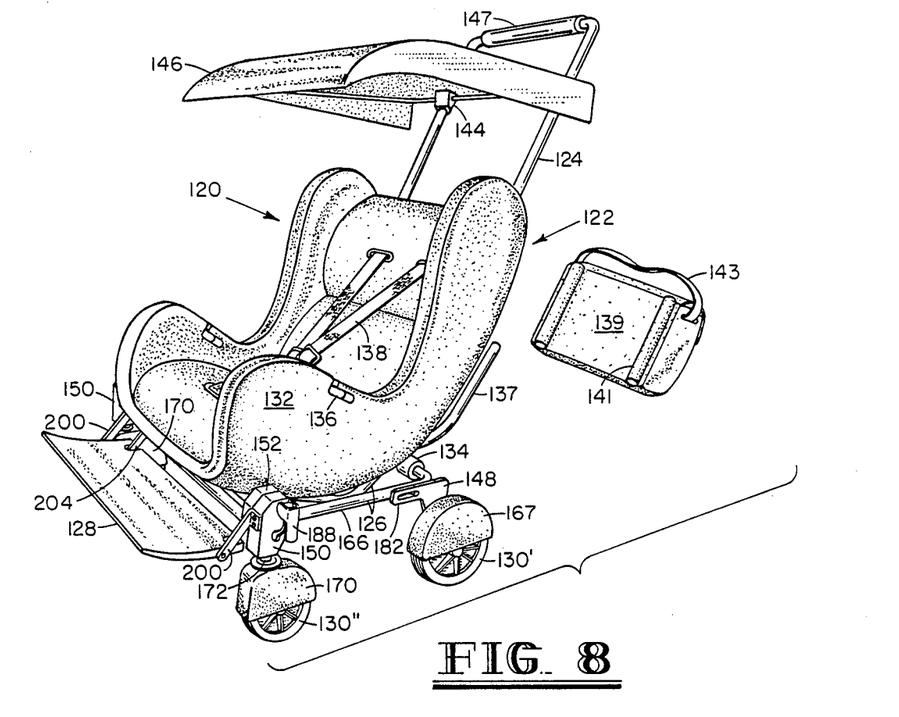
FIG. 8 is a perspective view of an alternative embodiment of the present invention showing the wheels thereof in the first, lowered position for use as a stroller.

As shown in FIGS. 3, 4 and 7, two of the wheels 30 are mounted to the front of chassis 48 on an axle 68 journaled in ears 70, ears 70 being pivotally mounted to chassis 48 on pin 72. Pin 72 is provided with torsion spring 74 which is anchored at one end through the center of pin 72 and at the other end on the shoulder 76 of cap 78. The combination of the anchoring of torsion spring 74 through the center of pin 72 and cap 78 causes the torsion spring 74 to act both as a shock absorber and to bias wheel 30 toward the dead center position to assist in the steering of apparatus 20 when used as a stroller and to facilitate the pivoting of the wheels 30 to the second, raised position by avoiding the engagement of the side walls 32 of chair 22 by the wheels 30. Two of the wheels 30 are mounted to the rear axle 80 and rear axle 80 is journaled in tab 82. Tab 82 is integral with chassis 48.

Figure 5:
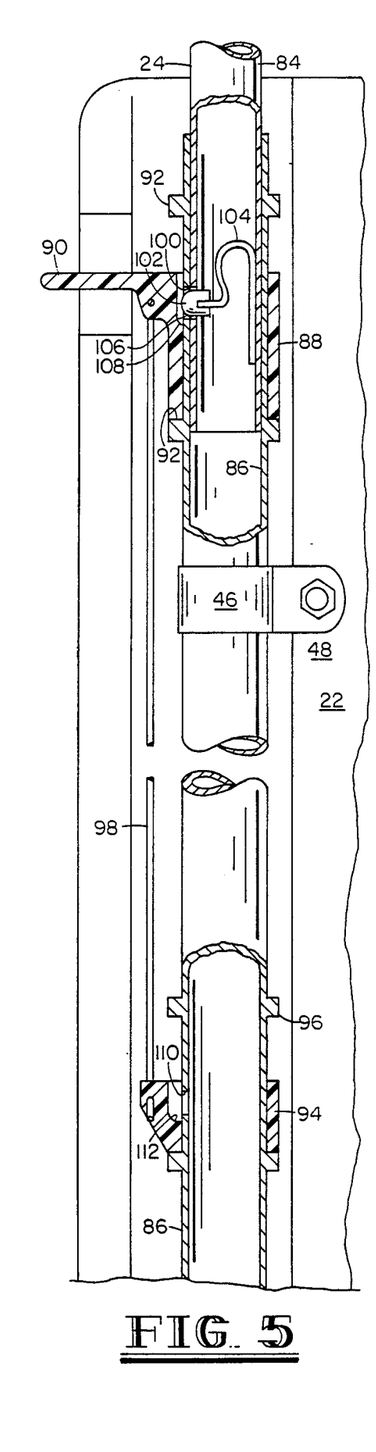
FIG. 5 is a plan view of a portion of the apparatus of FIG. 1 showing the means for extending the handle in partial sectional view.

Referring to FIG. 5, the means for extending handle 24 when wheels 30 are in the first, lowered position is shown. Handle 24 is comprised of upper 84 and lower 86 telescoping sections and means for locking handle 24 in an extended position. The handle locking means is comprised of a collar 88 having an integral lever arm 90 which is selectively movable along the length of lower section 86 between stop members 92. A similar collar 94 is likewise retained between the stop members 96 and moves up and down with collar 88 by virtue of the connection between collar 88 and collar 94 provided by wire 98. The upper section 84 of handle 24 is provided with a hole 100 through which the ball 102 mounted on the end of spring 104 projects. When ball 102 projects through hole 100, and into the hole 106 in lower section 86, the upper 84 and lower section 86 of handle 24 are prevented from telescoping movement relative to each other. Collar 90 is provided with camming surface 108 which, when collar 90 is raised upwardly using lever arm 90, engages the ball 102 and cooperates with the rounded surface of ball 102 to bias ball 102 inwardly while the upper section 86 is pulled upwardly by the user until the margin of the hole 106 engages the rounded surface of the ball 102, thereby continuing to bias ball 102 inwardly, out of engagement with hole 106, to allow telescoping movement of the upper section 84 relative to the lower section 86 of handle 24. The upper section 84 is shown in the extended position in FIG. 5, and it will be understood that, when the upper section 84 is retracted into the lower section 86, ball 102 will slide along inside the lower section 86 until encountering hole 110 in lower section 86, at which point ball 102 is biased outwardly by spring 104 to lock the upper section 84 in the retracted position. When it is desired to once again extend handle 24, lever 90 is raised and, by virtue of the connection to collar 94 provided by wire 98, the camming surface 110 of collar 94 functions in the same manner as the camming surface 108 of collar 88 to unlock the upper section 84 from the lower section and allow telescoping movement relative thereto.

Referring to FIG. 8-12, there is shown an alternative embodiment of the apparatus of the present invention indicated generally at reference numeral 120. Like the embodiment shown in FIGS. 1-7 and 13, the apparatus 120 is comprised of a chair 122, handle 124, frame 126 (see FIGS. 10 and 11), footrest 128 and wheels 130. The sides 132 of chair 122 are provided with means in the form of slots 136 to receive a seatbelt (not shown) to releasably retain the apparatus 120 on an automobile or airplane passenger seat. In the alternative embodiment shown in FIGS. 8-12, further means for engaging the seat belt (not shown) of the seat on which apparatus 120 rests is provided in the form of prongs 137 integral with chair 122. It will be understood that prongs 137 can also be integral with frame 126. Depending upon whether apparatus 120 is placed on the seat in the forward or rearward-facing direction, either slot 136 or prongs 137 can be used to engage the seat belt.

Figure 9:
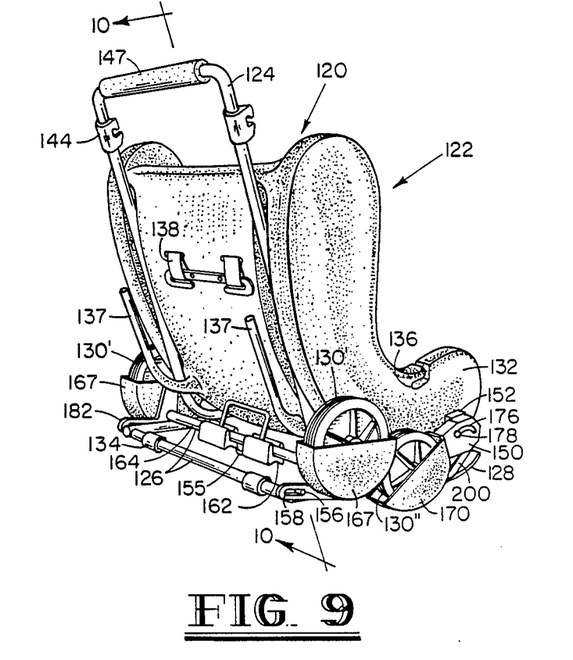
FIG. 9 is a perspective view of the apparatus in FIG. 8 showing the wheels in the second, raised position for use as an automobile safety seat.

Prongs 137 also provide a convenient point of attachment for travel bag 139 by virtue of the longitudinal loops 141 integral with travel bag 139 which receive prongs 137 therein. Travel bag 139 is provided with strap 143 for further convenience in carrying. A shoulder harness 138 is provided to retain a small child or infant within chair 122. Frame 126 is provided with rubber bumpers 134 on which the apparatus 120 rests when the wheels 130 are in the second, raised position as shown in FIGS. 9 and 10.

Figure 10:
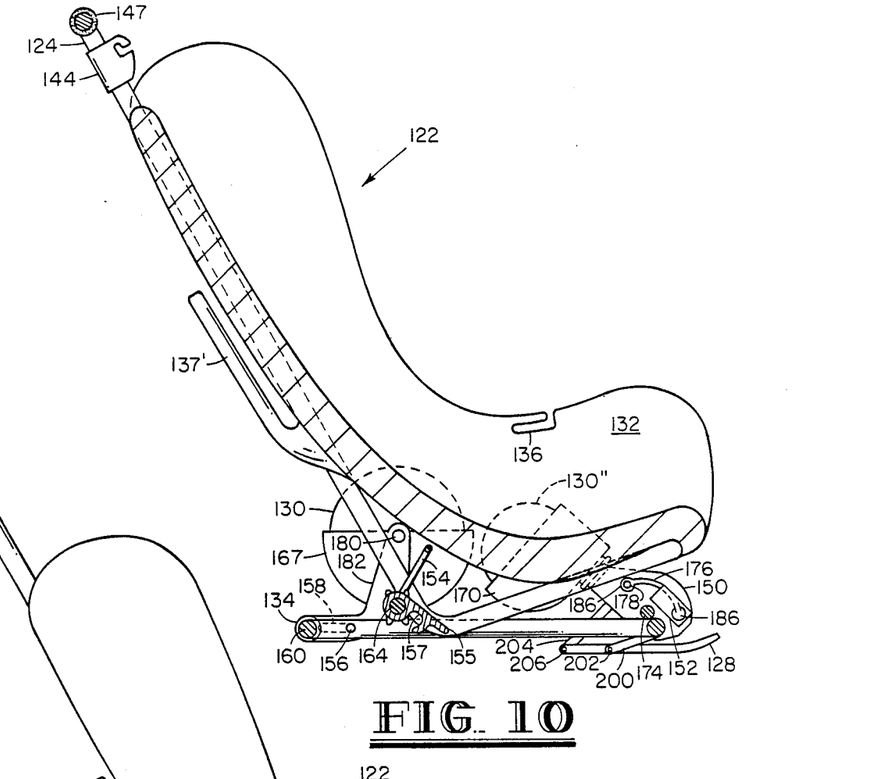
FIG. 10 is a sectional view of the apparatus of FIG. 8 taking along the lines 10—10 in FIG. 9.
Figure 11:
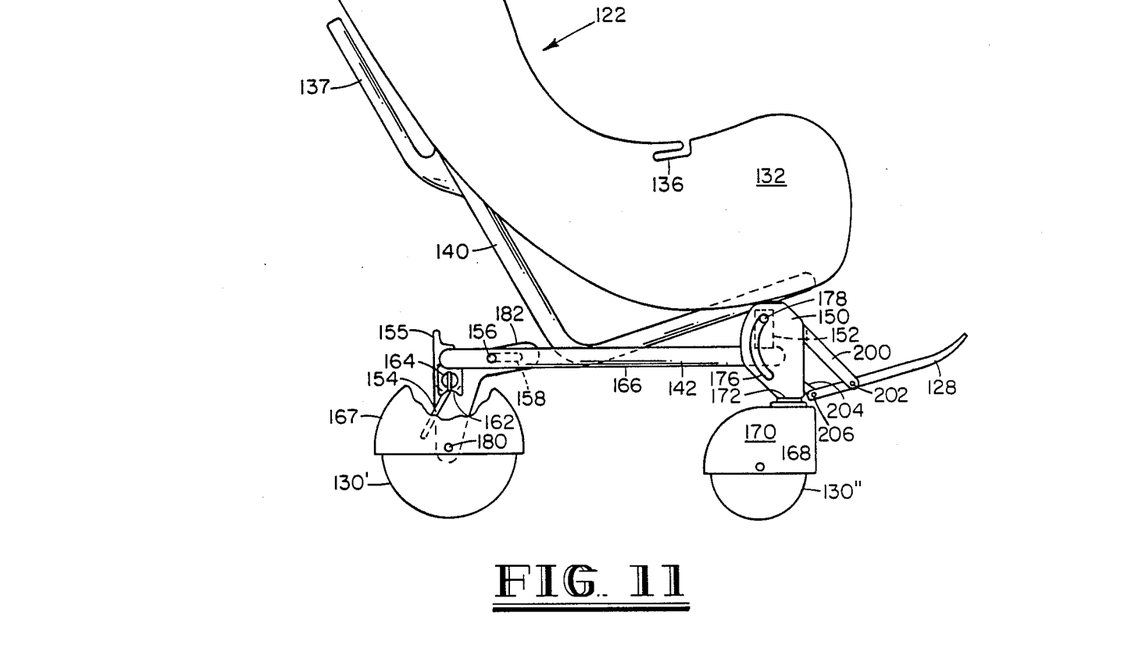
FIG. 11 is a side view of the apparatus of FIG. 8 showing the mechanism for pivoting the wheels between the first, lowered position and the second, raised position.

Referring to FIGS. 10 and 11, it can be seen that the frame 126 is comprised of tubular member 140 and integral subframe 142. Chair 122 is integral with tubular member 140, and handle 124 telescopes out of frame 126. The handle 124 is provided with a pair of pivot stops 144 to releasably receive sunshade 146 and with a rubber grip 147. Chassis 148 is comprised of pivoting member 150, stop member 152, and tabs 182. Tabs 182 are mounted to frame 126 by means of pin 156 which is integral with the sidebar 166 of subframe 142 journaled in the slot 158 in tabs 182. Rear wheels 130 are mounted on axles 180 integral with tabs 182.

Rear wheels 120 are releasably locked in a first, lowered position (see FIG. 11) by a resilient lock clip 155 pivotally mounted to brace 164. Lock clip 155 is provided with a channel 157 for engaging the most rearward bar 160 of subframe 142. When brace 164 is in the position shown in FIG. 11, lock clip 155 is pivoted and the channel 157 is snapped into engagement with bar 160 to releasably lock the wheels 130 mounted on tabs 182 into the first, lowered position. Rear wheels 130 are pivoted between a first, lowered position, shown in FIGS. 8 and 11, and a second, raised position, shown in FIGS. 9 and 10, by pulling backwardly on the bale 154 which is integral with the brace 164 connecting tabs 182 until the pin 156 reaches the forward margin of slot 158. Brace 164 is then pivoted around the most rearward bar 160 of frame 126, the camming surface of bale 154 assisting in the rotation of brace 164 around rearward bar 160, and then brace 164 is pushed forwardly until brace 164 rests on the sidebars 166 of subframe 142. Rear wheels 130 are provided with means positionable thereunder when in the second, raised position for covering wheels 130 to prevent soiling of the seat or other surface (not shown) on which apparatus 120 rests in the form of fairings 167 mounted on axle 180 in the form of fairings 167 which are carried with rear wheels 130 when pivoted from the first, lowered position shown in FIG. 11 to the second, raised position shown in FIG. 10. Fairings 167 rotate underneath wheels 130 to catch any dripping water, ice, mud or snow which may have collected on wheels 130 while apparatus 120 was used as a stroller.

Figure 12:
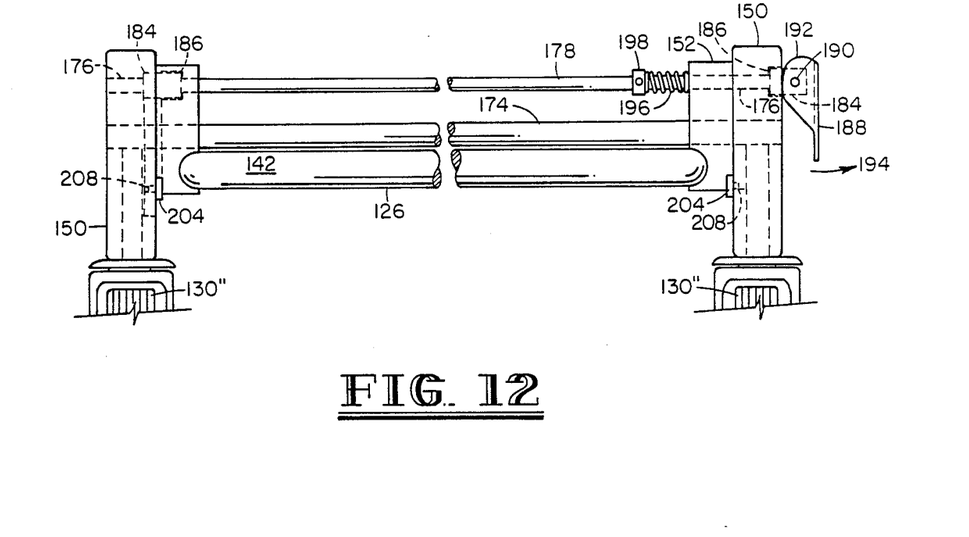
FIG. 12 is a front view of a portion of the mechanism for pivoting the front wheels of the apparatus of FIG. 8 from the first, lowered position for use as a stroller to the second, raised position for use as an automobile safety seat.

Front wheels 130 are mounted on axle 168 which is journaled in fairings 170. Front wheels 130, like rear wheels 130, are provided with means positionable thereunder for covering front wheels 130 to prevent soiling of the surface on which apparatus 120 rests in the form of fairings 170. Fairings 170 are mounted on pins 172 (see FIG. 12) which are journaled in pivoting members 150 to allow wheels 130 mounted on axle 168 to pivot to steer the apparatus 120 when used as a stroller. Referring to FIG. 12, the mechanism for pivoting the front wheels 130 into the second, raised position is shown in detail. Wheels 130 and fairings 170 pivot on pivoting member 150 around axle 174. As shown in FIGS. 10 and 11, pivoting members 150 pivot in an arc defined by the slot 176 in pivoting members 150 which receives bar 178.

Bar 178 is provided with integral blocks 184 on the ends thereof which are received within the recesses 186 in pivoting members 150. Blocks 184 are secured into engagement with recesses 186 by means of the pivoting lever 188 which is mounted to block 184 by pin 190. Lever 188 is provided with a curved bearing surface 192 which engages the exterior surface of pivoting member 150, and pin 190 is mounted in a position off-center of the radius of curvature of bearing surface 192. When lever 188 is moved in the direction of arrow 194, bearing surface 192 and the off-center mounting of pin 190, in cooperation with the spring 196 which bears against stop 198 and stop member 152, bias block 184 out of recesses 186. The pivoting members 150 are then pivoted through the arc formed by slot 176 from the position shown in FIG. 11 to the position shown in FIG. 10 around axle 174. The lever 188 is then returned to the position shown in FIG. 12 and blocks 184 are once again able to be seated within recesses 186.

At the same time that pivoting members 150 are being pivoted from the position shown in FIG. 11 to the position shown in FIG. 10, footrest 128 is retracted from the extended position shown in FIG. 11 to the retracted position shown in FIG. 10. The extension and retraction of footrest 128 is made possible by the rigid mounting of link arm 200 to the pivoting member 150 at one end thereof and the mounting of link arm 200 the footrest 128 on pivot pin 202 at the other end thereof. A second link arm 204 is pivotally mounted to footrest 128 at pivot pin 206 and to stop member 152 on rivet 208 (see FIG. 12). As can be seen by comparing FIGS. 10 and 11, the rigid mount of link arm 200 to pivoting member 150 causes the pivoting of footrest 128 relative thereto on pivot pin 202 to retract footrest 128 as pivoting member 150 rotates around the axle 174. When retracted as shown in FIG. 10, the bottom surface of footrest 128 and bumpers 134 form legs for supporting the apparatus 120 when the wheels 130 are in the second, raised position.

Although the invention has been described in conjunction with the foregoing specific embodiments, many alternatives, variations and modifications will be apparent to those skilled in the art who have the benefit of this disclosure. Those alternatives, variations and modifications are intended to fall within the spirit and scope of the following claims.

What is claimed is:

1. A combination car seat and stroller apparatus for infants and small children comprising:
    a frame having an upright back portion connected to a horizontally disposed, generally rectangularly shaped base portion adapted to rest on a vehicle seat;
    a seat adapted for holding infants and small children secured to said frame;
    a set of retractable rear wheel and fairing assemblies;
    means for attaching said set of retractable rear wheel and fairing assemblies to the rear portion of said frame base portion and for retracting said assemblies from a first lower position in which the wheels of said assemblies are in position for use as a stroller to a second position in which the wheels of said assemblies are raised to a stored position adjacent the sides of said seat in position for use as a car seat wherein said retracting means comprises
        L-shaped wheel mounting tabs secured at one end thereof to the fairing of each of said wheel and fairing assemblies and having a slot in the other end thereof,
        a set of pivot pins fixedly mounted on the sides of said frame base portion for engaging the slot in said wheel mounting tabs whereby said wheel and fairing assemblies may be pivoted rearwardly and upwardly and then forwardly in an arc from said lower position toward said seat and then rearwardly to said second stored position, said pins engaging the forward margins of the slots when said rear retractable wheel and fairing assemblies are in said first lower position and said pins engaging the rearward margins of the slots when said rear retractable wheel and fairing assemblies are in second stored position, and
        means for interconnecting said wheel mounting tabs whereby said wheel mounting tabs on both sides of said frame base portion are moved together;
    means for securing said rear retractable wheel and fairing assemblies in said first lower position;
    a set of retractable front wheel and fairing assemblies;
    means for attaching said set of retractable front wheel and fairing assemblies to the front portion of said frame base portion and for retracting said assemblies from a first lower position in which the wheels of said assemblies are in position for use as a stroller to a second position in which the wheels of said assemblies are raised to a stored position adjacent the sides of the seat in a position for use as a car seat wherein said retracting means comprises
        front wheel mounting members pivotally attached to each of said wheel and fairing assemblies and pivotally mounted to the front of said frame base portion whereby said wheel and fairing assemblies may be pivoted from said first position to said second stored position; and
        means for locking said set of wheel and fairing assemblies in said first and second positions.

2. A combination car seat and stroller apparatus as set forth in claim 1 further comprising:
    a footrest pivotally linked to said front wheel mounting members whereby said footrest is retracted to a position under the front portion of said frame when said wheel and fairing assemblies are retracted from said first position to said second stored position.

3. A combination car seat and stroller apparatus as set forth in claim 1 wherein said means for securing said rear retractable wheel and fairing assemblies in said first lower position includes:
    a camming surface thereon for engaging said frame base portion to guide the pivoting of said wheel mounting tabs on said pivot pins upwardly from said first position to said second stored position.

* * * * *